US011933093B2

(12) United States Patent
Heidrich

(10) Patent No.: US 11,933,093 B2
(45) Date of Patent: Mar. 19, 2024

(54) VEHICLE DOOR OPERATOR SYSTEM

(71) Applicant: Westinghouse Air Brake Technologies Corporation, Pittsburgh, PA (US)

(72) Inventor: Peter Heidrich, Des Plaines, IL (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 157 days.

(21) Appl. No.: 17/610,650

(22) PCT Filed: May 13, 2020

(86) PCT No.: PCT/US2020/032614

§ 371 (c)(1),
(2) Date: Nov. 11, 2021

(87) PCT Pub. No.: WO2020/236475

PCT Pub. Date: Nov. 26, 2020

(65) Prior Publication Data

US 2022/0205297 A1 Jun. 30, 2022

Related U.S. Application Data

(60) Provisional application No. 62/850,137, filed on May 20, 2019.

(51) Int. Cl.

| | |
|---|---|
| ***E05D 15/06*** | (2006.01) |
| ***E05D 15/10*** | (2006.01) |
| ***E05F 15/646*** | (2015.01) |

(52) U.S. Cl.

CPC ........ *E05D 15/1044* (2013.01); *E05F 15/646* (2015.01); *E05D 2015/1055* (2013.01);

(Continued)

(58) Field of Classification Search

CPC ............ E05D 15/1044; E05D 15/1068; E05D 2015/1055; E05D 2015/1071;

(Continued)

(56) References Cited

U.S. PATENT DOCUMENTS 4,091,570 A * 5/1978 Favrel .................. E05F 15/652 49/362
5,893,236 A * 4/1999 Krbec .................. B61D 19/008 49/210

(Continued)

FOREIGN PATENT DOCUMENTS

| | | |
|---|---|---|
| CA | 2217078 C | 11/1998 |
| CN | 1198997 | 11/1998 |

(Continued)

OTHER PUBLICATIONS

Extended European Search Report received for related European Patent Application No. 20809855.8 dated Dec. 7, 2022 (8 pages).

(Continued)

*Primary Examiner* — Jerry E Redman

(74) *Attorney, Agent, or Firm* — The Small Patent Law Group LLC; Christopher R. Carroll

(57) ABSTRACT

A system with a base may be mounted on a vehicle, and a carriage assembly that may be movably connected to the base and may move with respect to the base. The carriage assembly may include a motor including a motor output shaft and motor housing, and a driving mechanism may couple to a door and to the motor output shaft or the motor housing. The carriage assembly may also include a coordination bar may be coupled to the motor output shaft or the motor housing, the motor output shaft or the motor housing may rotate the coordination bar responsive to operation of the motor. At least one linkage assembly may extend or retract to move the carriage assembly to move the door (Continued)

between an open position and a closed position based on rotation of the coordination bar.

16 Claims, 6 Drawing Sheets

(52) U.S. Cl.
CPC ..... *E05Y 2201/626* (2013.01); *E05Y 2900/51* (2013.01); *E05Y 2900/531* (2013.01)

(58) Field of Classification Search
CPC ..... E05F 15/646; E05F 15/655; E05F 15/643; E05Y 2201/626; E05Y 2201/22; E05Y 2201/404; E05Y 2201/608; E05Y 2201/624; E05Y 2201/684; E05Y 2900/51; E05Y 2900/531; E05Y 2600/456; E05Y 2800/266
USPC .......... 49/116, 118, 122, 123, 209, 210, 211, 49/213, 216, 221, 223
See application file for complete search history.

(56) References Cited

U.S. PATENT DOCUMENTS

| | | | | |
|---|---|---|---|---|
| 6,385,910 | B1 * | 5/2002 | Smink | E05D 15/08 49/213 |
| 6,539,669 | B1 * | 4/2003 | Heidrich | E05F 15/652 49/213 |
| 6,684,567 | B2 * | 2/2004 | Heidrich | E05F 5/06 49/213 |
| 9,931,913 | B2 | 4/2018 | Prevost et al. | |
| 10,119,319 | B2 * | 11/2018 | Ritt | E05F 15/652 |
| 10,246,919 | B2 | 4/2019 | Mair et al. | |
| 10,328,955 | B2 * | 6/2019 | Yamaguchi | B61D 19/005 |
| 10,889,307 | B2 * | 1/2021 | Sakaki | B61D 19/003 |
| 2006/0225356 | A1 * | 10/2006 | Jarolim | E05D 11/00 49/218 |
| 2022/0205297 | A1 * | 6/2022 | Heidrich | E05F 15/655 |

FOREIGN PATENT DOCUMENTS

| | | | | | |
|---|---|---|---|---|---|
| CN | 1818311 | A | | 8/2006 | |
| CN | 102661101 | | | 9/2012 | |
| CN | 203296558 | U | | 11/2013 | |
| CN | 111305690 | A | * | 6/2020 | E05D 15/1005 |
| EP | 0878371 | B1 | | 7/2003 | |
| EP | 19946501 | | | 10/2003 | |
| EP | 69816366 | | | 4/2004 | |
| EP | 1040979 | | | 4/2007 | |
| EP | 1527975 | | | 9/2007 | |
| EP | 1314626 | B1 | | 1/2008 | |
| WO | WO-2005042893 | A1 | * | 5/2005 | E05B 79/20 |
| WO | WO-2013170558 | A1 | * | 11/2013 | B61D 19/008 |
| WO | WO-2020236475 | A1 | * | 11/2020 | E05D 15/1044 |

OTHER PUBLICATIONS

First Examination Report received for related Australian Patent Application No. 2020279614 dated Dec. 12, 2022 (4 pages).
2nd Examination Report received for related AU Patent Application No. 2020279614 dated Mar. 25, 2023 (4 pages).
Requisition received for related CA App No. 3,138,038 dated Jan. 23, 2023 (3 pages).
International Preliminary Report on Patentability for corresponding International application No. PCT/US2020/032614 dated Dec. 2, 2021.
International Search Report and Written Opinion for corresponding International application No. PCT/US2020/032614 dated Aug. 25, 2020.
2nd Office Action received for related Chinese Patent Application No. 2020800373528 dated Jan. 19, 2023 (17 pages).
English translation of the First Office Action received for related Chinese Patent Application No. 202080037352.8 dated Aug. 17, 2022 (12 pages).
First Office Action received for related Chinese Patent Application No. 202080037352.8 dated Aug. 17, 2022 (9 pages).

* cited by examiner

VEHICLE DOOR OPERATOR SYSTEM

CROSS REFERENCE TO RELATED APPLICATIONS

This application is a national phase application of international application PCT/US2020/032614, filed 13 May 2020, which claims priority to U.S. Provisional Application No. 62/850,137, filed 20 May 2019, and is titled "Device for Moving at Least One Door Leaf in a Sliding and Plugging Motion" the entirety of each disclosure of which is incorporated by reference.

BACKGROUND

Technical Field

The subject matter described relates generally to a vehicle door operator assembly.

Discussion of Art

Vehicle door operator assemblies, such as those on rail vehicles, buses, transit vehicles, or the like, typically open with a sliding and plugging motion. A method for electrically powering an outside sliding plug door system is by using an electric motor having an output shaft that turns a lead screw. The lead screw nut is driven by the lead screw and, in turn, moves the door panels longitudinally, parallel to the door opening of the vehicle. The motor itself is not rigidly attached to a stationary frame, but is instead allowed to move axially. The axial force imparted by the lead screw is used to drive a linkage which plugs and unplugs the door panels laterally into and out of the door opening of the transit vehicle. Door operators utilizing such a configuration suffer from certain disadvantages due to the lead screw being an inherently low-efficiency device and due to the expenses related to replacement of the ball screw.

Another known method for electrically powering an outside sliding plug door system is by using an electric motor having an output shaft that turns a toothed drive pulley, which drives a toothed belt. The toothed belt is attached to the door panels to drive longitudinal movement of the door panels. The motor housing is rigidly attached to a pin riding in a helical cam, so that when the motor body rotates, it moves axially due to the helical cam. This axial movement provides the lateral plugging/unplugging motion to the door panels. The system may require the use of two helical cams, which must be synchronized to ensure that the door panel or panels plug/unplug evenly from the door opening. An example of such a system is disclosed in U.S. Pat. No. 9,931,913. It may be desirable to have a system and method that differs from those that are currently available.

BRIEF DESCRIPTION

According to one or more embodiments, a system may be provided that includes a base that may be mounted on a vehicle above a door, and a carriage assembly that may be movably connected to the base and can move with respect to the base. The carriage assembly may include a motor including a motor output shaft and a motor housing, and a driving mechanism may couple to the door and to couple to the motor output shaft or the motor housing. The driving mechanism may move in response to operation of the motor. The carriage assembly may also include a coordination bar that may couple to the motor output shaft, or the motor housing, the motor output shaft or the motor housing may rotate the coordination bar responsive to operation of the motor. The system may also include at least one linkage assembly may be coupled between the base and the coordination bar. The at least one linkage assembly may extend or retract to move the carriage assembly with respect to the base to move the door between an open position and a closed position based on rotation of the coordination bar.

In one or more embodiments, a system may include a base that may be mounted on a transit vehicle above a door, and a carriage assembly movably connected to the base and may move with respect to the base. The carriage assembly may include a motor including a motor output shaft and a motor housing, a driving mechanism may couple to the door and coupled to one of the motor output shaft or the motor housing and may move in response to operation of the motor, and a coordination bar may be coupled to the motor output shaft or the motor housing, the motor output shaft or the motor housing may rotate the coordination bar responsive to operation of the motor to move the door between an open position and closed position based on rotation of the coordination bar. The system may also include a lever coupled to the coordination bar and may move over center when the carriage assembly is extended with respect to the base to form an over center lock.

In one or more embodiments, a system may be provided including a base that may be mounted on a transit vehicle above a door, and a carriage assembly movably connected to the base and may move with respect to the base. The carriage assembly may include a motor including a motor output shaft that may rotate in a first direction and a motor housing that may rotate in a second direction opposite the first direction, a driving mechanism that may couple to the door and coupled to one of the motor output shaft or the motor housing and that may rotate in the first direction in response to operation of the motor, and a coordination bar may be coupled to the motor output shaft or the motor housing, the motor output shaft or the motor housing that may rotate the coordination bar in the second direction responsive to operation of the motor. The system may also include at least one linkage assembly coupled between the base and the coordination bar and may extend or retract to move the carriage assembly with respect to the base to move the door between an open position and a closed position based on rotation of the driving mechanism in the first direction and rotation of the coordination bar in the second direction.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a vehicle door operator system that includes a sliding and plugging action. The vehicle door operator system includes a motor that has an output shaft that rotates in a first direction to actuate a driving mechanism to move a door with a sliding action (e.g. longitudinal direction), and a motor housing that rotates in an opposite second direction to actuate a linkage assembly to move the door with a plugging action (e.g. lateral direction). In this manner, the door both moves outwardly from the door opening and slides away from the opening accordingly based on the motor operation.

In one embodiment, the plugging motion and force are obtained through linkages. The linkages may include geometry that imparts a higher force the closer the linkages become co-linear to one another, and are self-locking when the linkages travel over a center position. To coordinate the lateral movement of a corresponding carriage with the plugging and unplugging motion, a solid coordinating bar may be used. In other embodiments, the coordinating bar may be rigid or semi-rigid, and may be solid or hollow. The use of a coordinating bar may improve the vehicle door operator system compared to other systems, such as a toothed belt.

Figure 1:
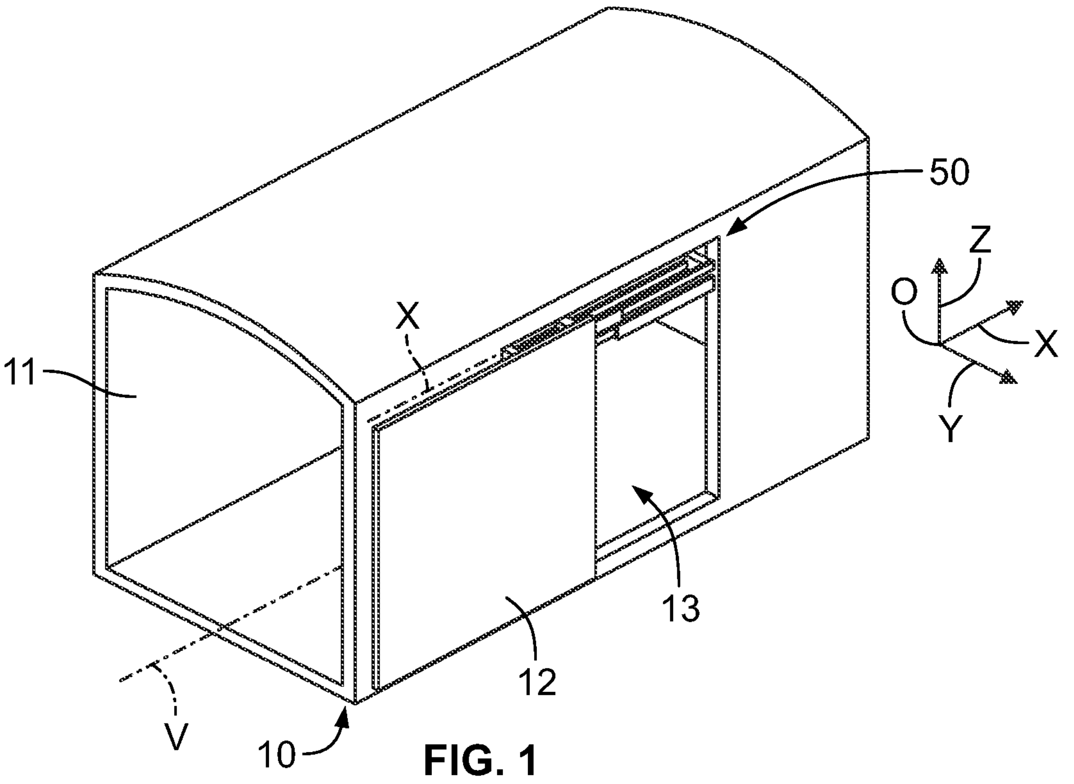
FIG. 1 is a perspective view of a portion of a vehicle.
Figure 2:
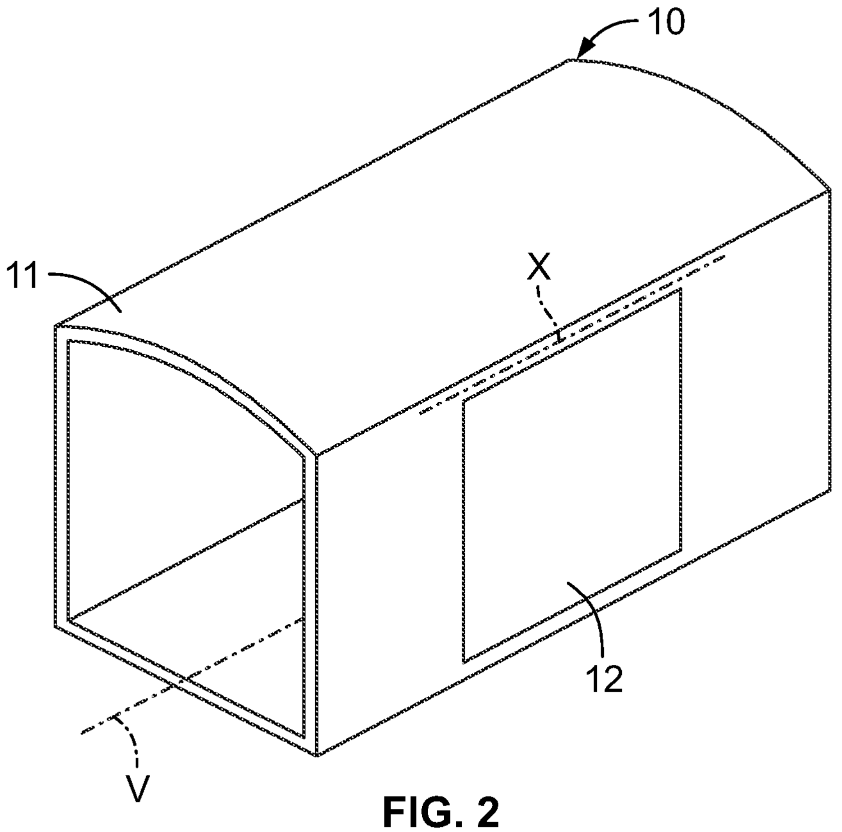
FIG. 2 is a perspective view of the portion of the vehicle of FIG. 1 with the door panel in a closed position.

FIGS. 1 and 2 illustrate a portion of a vehicle 10, such as a passenger bus, subway car, trolley car, other rail vehicle, or another non-rail vehicle, etc. The vehicle may include a body 11 extending along a vehicle longitudinal axis V. The vehicle body includes a wall structure with one or more door openings or portals 13 defined therein to allow passengers to enter and exit the vehicle. The vehicle also includes a door assembly that includes a single door panel 12 that is moved by a door operator system 50 between open and closed positions with respect to the door opening. In particular, the door operator system may move the door panel in a door opening and closing direction X along the door opening. The door opening and closing direction may be substantially parallel to the wall of the vehicle body and possibly the vehicle longitudinal axis, and in a lateral direction into and out of the door opening transverse to or substantially transverse to the door opening and closing direction. The opening and closing motion may be referred to as a plugging/unplugging motion.

To move the door panel to the open position, shown in FIG. 1, the door operator system is activated to move the door panel laterally outward from the door opening, i.e., an unplugging motion, and then move the door panel along the door opening in the door opening and closing direction longitudinally in a sliding motion to the open position to allow passengers to enter and exit the vehicle through the door opening. The door operator system may also at least partially perform the sliding movement along the door opening and closing direction simultaneously with the lateral unplugging movement.

To move the door panel to the closed position, shown in FIG. 2, the door operator system is again activated to slide the door panel longitudinally along the door opening in the door opening and closing position back toward the closed position and then (or partially simultaneously) move the door panel laterally inward to the door opening, i.e., a plugging motion. It is to be appreciated that when in the closed position, the door panel may extend flush with the wall of the vehicle body and may be in a sealed engagement with the wall or a door frame formed in the vehicle body.

Figure 3:
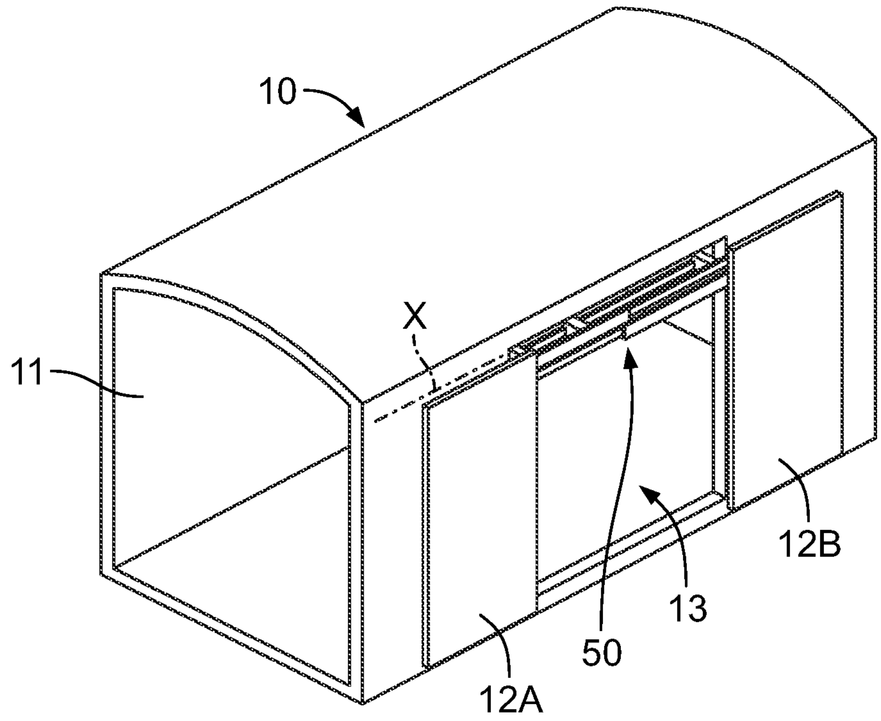
FIG. 3 is a perspective view of a portion of a vehicle having a bi-parting two-door assembly.
Figure 4:
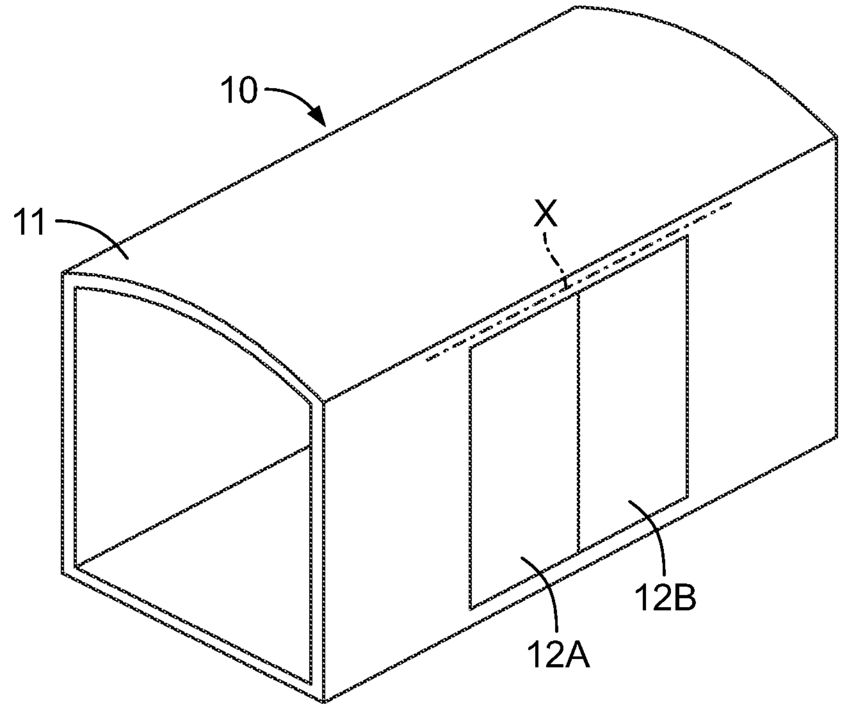
FIG. 4 is a perspective view of the portion of the vehicle of FIG. 3 with the door panels in a closed position.

FIGS. 3 and 4 illustrate another example vehicle. According to this example, the door assembly includes a pair of door panels 12A, 12B that are moved in a coordinated manner by the door operator system between respective open and closed positions with respect to the door opening. In particular, the door operator system may move the pair of door panels opposite to each other along the door opening longitudinally in the door open and closing direction and in the lateral direction into and out of the door opening transverse to or substantially transverse to the door opening and closing direction.

To move the door panels to the open position, shown in FIG. 3, the door operator system is activated to the move the door panels laterally outward from the door opening, i.e., an unplugging motion, and then move the door panels away from each other along the door opening in a sliding motion in the door opening and closing direction to the open position. To move the door panels to the closed position, shown in FIG. 4, the door operator system is again activated to move the door panels toward each other in a sliding motion along the door opening in the door opening and closing direction back toward the closed position and then move the door panels laterally inward to the door opening, i.e., a plugging motion.

The door operator system may be arranged such that the plugging and unplugging movements of the pair of door panels are made at least partially simultaneously with the movements in the door opening and closing direction. The door operator system may also be arranged such that door panels may be moved between the open and closed positions in a coordinated, simultaneous manner. It is further to be appreciated that when in the closed position, the door panels may extend flush with each other and/or with the wall of the vehicle body and may be in a sealed engagement with each other and/or with the wall or a door frame formed in the vehicle body.

With reference to FIGS. 5-7B, an example door operator system is shown. In one example, the door operator system may be used for controlling the motion of the door panels in any of the FIGS. 1-4. To this end, the door operator system may move a door or a pair of doors of a vehicle along a door opening in a vehicle between open and closed positions in the manner discussed above. As discussed above, the door operator system may operate a single door panel or a pair of bi-parting door panels in a vehicle, which may be a passenger bus, subway car, trolley car, other rail vehicle, or similar vehicle. More generally, the door operator system could be used in any situation, for example a limited-access transit embarkation platform, where it is desired to provide a door that moves in the manner as set forth herein. For ease of illustration and explanation, FIGS. 5-7B illustrate the top portions of two door panels 59A, 59B connected to the door operator system instead of the entire door panels.

The door operator system may include a base 51 that may be mounted on the vehicle above the door opening. The base may extend along a longitudinal axis L which, when the base is mounted on the vehicle, extends parallel to the door opening and closing direction (see FIGS. 1-4) and may also be oriented parallel to the vehicle longitudinal axis (shown in FIGS. 1-4).

As shown in FIGS. 5-7B, the door operator system may also include a carriage assembly 52 that may be movably coupled to the base and can be driven to move with respect to the base in a transverse direction T perpendicular to the longitudinal axis of the base. In one example, the carriage assembly may be movably coupled by rollers 69 disposed on opposite longitudinal ends of the carriage assembly, which engage tracks 70 defined in the respective ends of the base. Alternatively, a tongue and groove coupling, sliders, matching patterns, wheels, gearing, etc. may provide the coupling such that the carriage assembly may be movably coupled to the base.

The carriage assembly may incorporate the components for mounting the one or two door panels to the door operator system to drive movement of the door panels between the open and closed positions. The components for mounting may include fasteners, nuts and bolts, adhesive, welding, or the like.

The carriage assembly includes a motor 53, which may include a motor output shaft 54 and a motor housing 55. In one embodiment, the motor is not structurally fixed to the carriage assembly and, as such, the motor housing is able to rotate freely counter to the rotation of the motor output shaft in reaction to the torque output to the motor output shaft. Alternatively, the housing may be stationary, but gearing is provided to provide an input that rotates in an opposite direction to the motor output shaft.

In one example, a right angle gear box 56 may be disposed on the carriage assembly and connected to the motor output shaft. A driving mechanism 49 is provided that in one example may include a toothed drive pulley 57 that extends from the right angle gear box. While in this example a toothed drive pulley may be provided, in other examples other driving mechanism may include a sprocket, gear, etc. Actuation of the motor drives rotation of the motor output shaft, which is then translated to the toothed drive pulley via the right angle gear box.

The driving mechanism in one embodiment may include a toothed drive belt 58 that may engage the toothed drive pulley and a return pulley 71 disposed on the carriage assembly away from the toothed drive pulley. The drive belt may be operatively coupled to the motor output shaft via the right angle gear box and the drive pulley such that operation of the motor causes rotation of the drive belt in a first rotational direction in a direction parallel to the longitudinal axis of the base. As a result, the drive belt may be driven to rotate around the drive pulley and the return pulley about a rotational axis that is perpendicular or substantially perpendicular to the longitudinal axis of the base.

The door panels may each be coupled to the drive belt by a respective clamp 72A, 72B. Alternatively, the door panels may each be coupled to the drive belt by fasteners, bolts, clips, etc. In one example, one door panel may be attached by the clamp to an upper portion of the drive belt. The other door panel may be attached by the other clamp to a lower portion of the drive belt. In this manner, the drive belt causes the door panels to slide opposite to each other in the door opening in the closing direction. The door panels are slidably mounted and supported on respective support beams 67, 68 for movably and structurally supporting the door panels on the carriage assembly.

With reference to FIGS. 5-7B, the carriage assembly also may include a coordination bar 60 coupled to the motor housing such that operation of the motor causes rotation of the coordination bar through rotation of the motor housing counter to the rotation of the motor output shaft in a second direction.

Figure 7B:
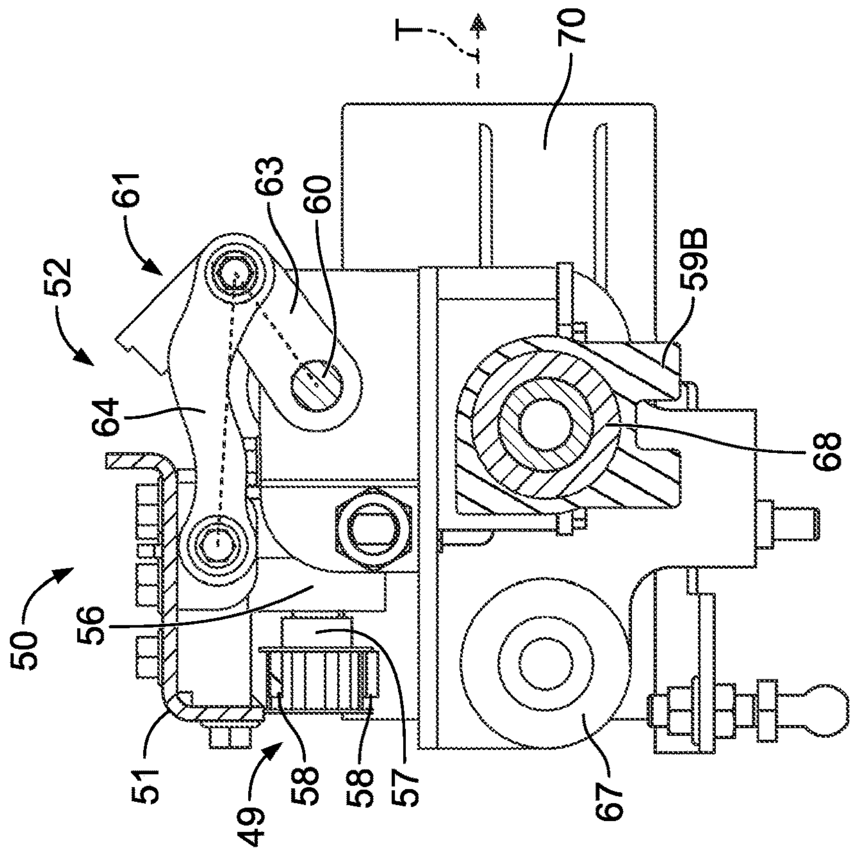
FIG. 7B is a longitudinal cross-sectional view of the vehicle door operator system of FIG. 5.
Figure 7A:
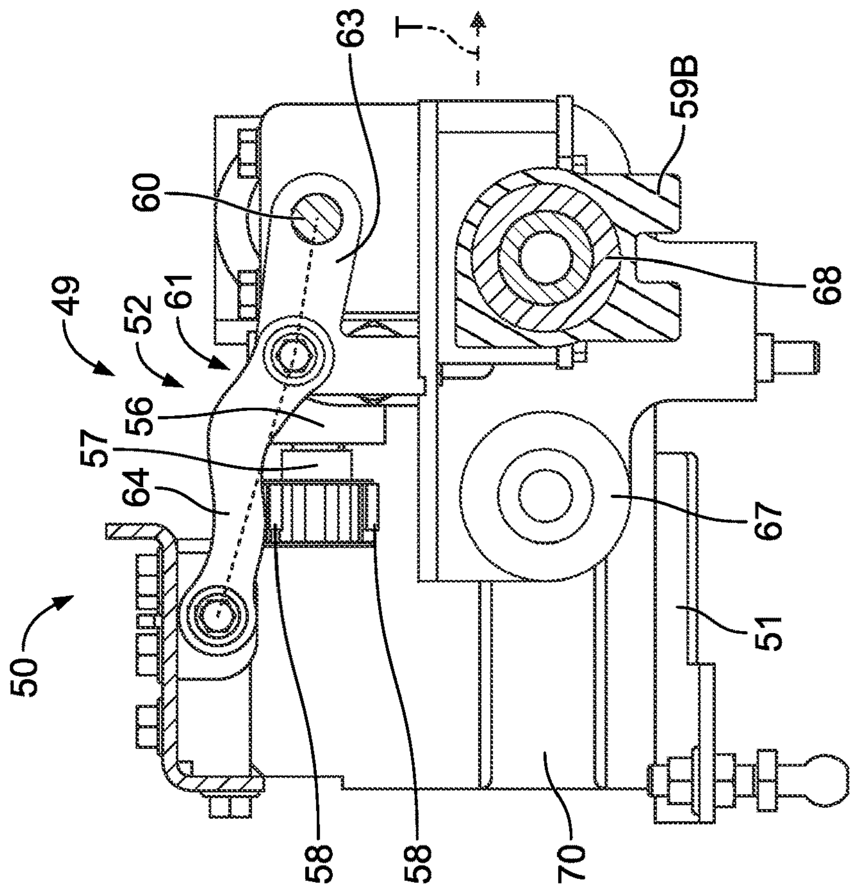
FIG. 7A is a longitudinal cross-sectional view of the vehicle door operator system of FIG. 5.

The door operator system further includes two linkage assemblies 61, 62 coupled between the base and the coordination bar. In one example, each linkage assembly may include a lever 63 fixedly coupled to the coordination bar, and a linkage arm 64 pivotably coupled between the lever and the base. Alternatively, the linkage arm may include an extension, or other movable member. Specifically, the linkage assembly does not include a helical member for movement purposed. As shown in FIGS. 7A and 7B, rotation of the coordination bar actuates the linkage assemblies to extend or retract and, thereby, move the carriage assembly with respect to the base in the transverse direction T between the extended and retracted positions, which correspond to the closed and opened positions of the door panels, respectively.

As shown in FIG. 7A, when the carriage assembly is in the extended position, the levers and the linkage arms are moved over center with respect to each other so as to form an over center locking mechanism that locks the door panels in the closed position and prevents or hinders a passenger from pushing or forcing movement of the door panels out of the door opening to open the pair of door panels. According to an alternative example of the present disclosure, a single linkage assembly may be used to drive movement of the carriage assembly and the door panels with respect to the base.

To move the door panels between the open and closed positions, the motor may be actuated via a central or local control to drive rotation of the motor output shaft with respect to the motor housing. The motor output shaft is operatively coupled to the drive belt via the right angle gearbox and the drive pulley such that operation of the motor causes the drive belt to move about the drive pulley and the return pulley in the direction parallel to the longitudinal axis of the base, which causes the door panels to move opposite to each other along the door opening in the door opening and closing direction. As discussed above, the motor housing is unfixed and freely rotatable with respect to the carriage assembly. The motor housing is coupled to the coordination bar such that rotation of the motor housing opposite to the rotation of the motor output shaft causes the coordination bar to rotate.

Rotation of the coordination bar causes the linkage assemblies to extend or retract, and thereby drive movement of the carriage assembly with respect to the base in the transverse direction T between the extended and retracted positions and cause the door panels to move into or out of the door opening in the lateral direction. In this manner, the motor acts as a differential mechanism between the coordination bar and the drive belt. In one embodiment, the motor may alternatively be arranged such that the motor output shaft is coupled to the coordination bar and the motor housing is coupled to the right angle gear box and the drive belt. Specifically, the motor provides two separate and opposite rotations so that each can be used to actuate the right angle gear box, or coordination bar.

Accordingly, the door operator system utilizes the output of the motor to actuate movement of the door panels laterally into and out of the door opening, i.e., a plugging/unplugging motion. The motor also actuates movement of the door panels along the door opening in the door opening and closing direction between the open and closed positions illustrated in FIGS. 1-4.

Figure 5:
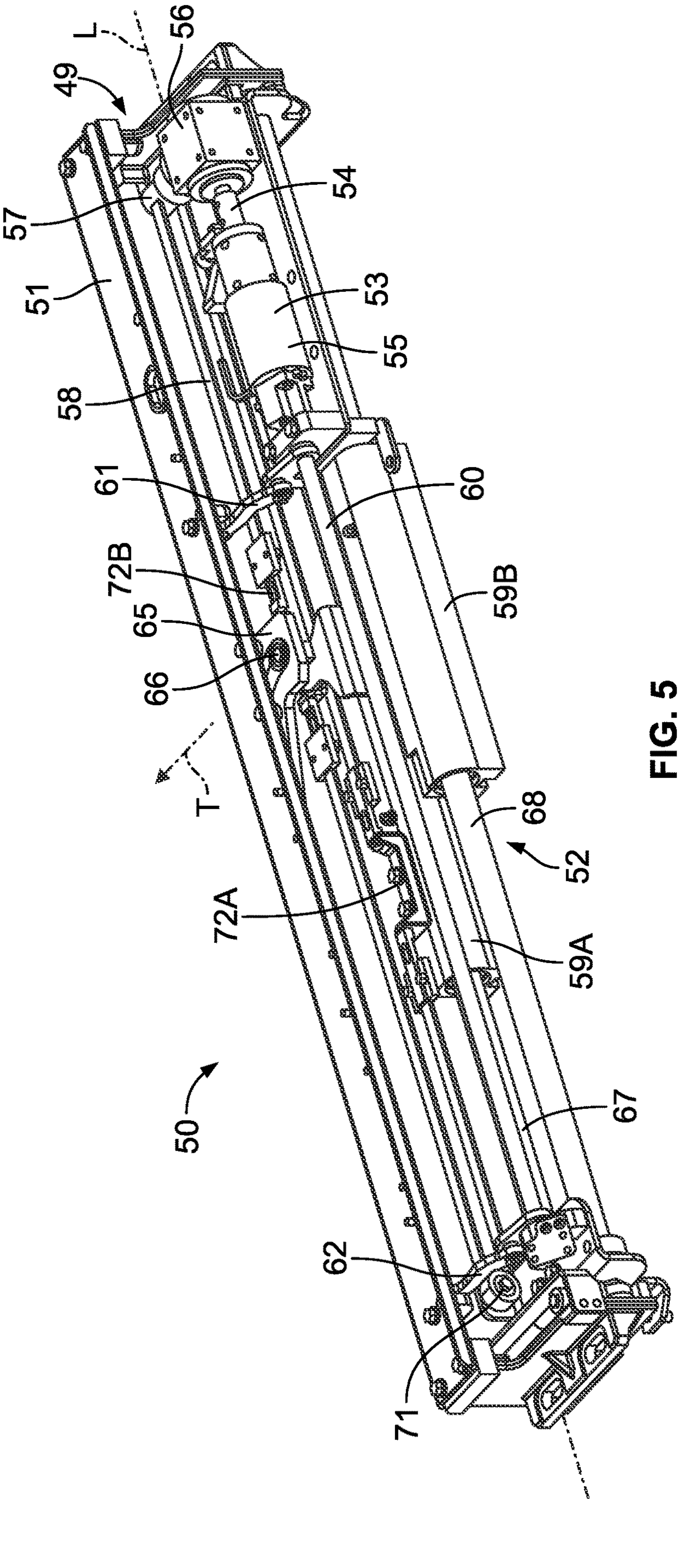
FIG. 5 is a perspective view of a vehicle door operator system.
Figure 6:
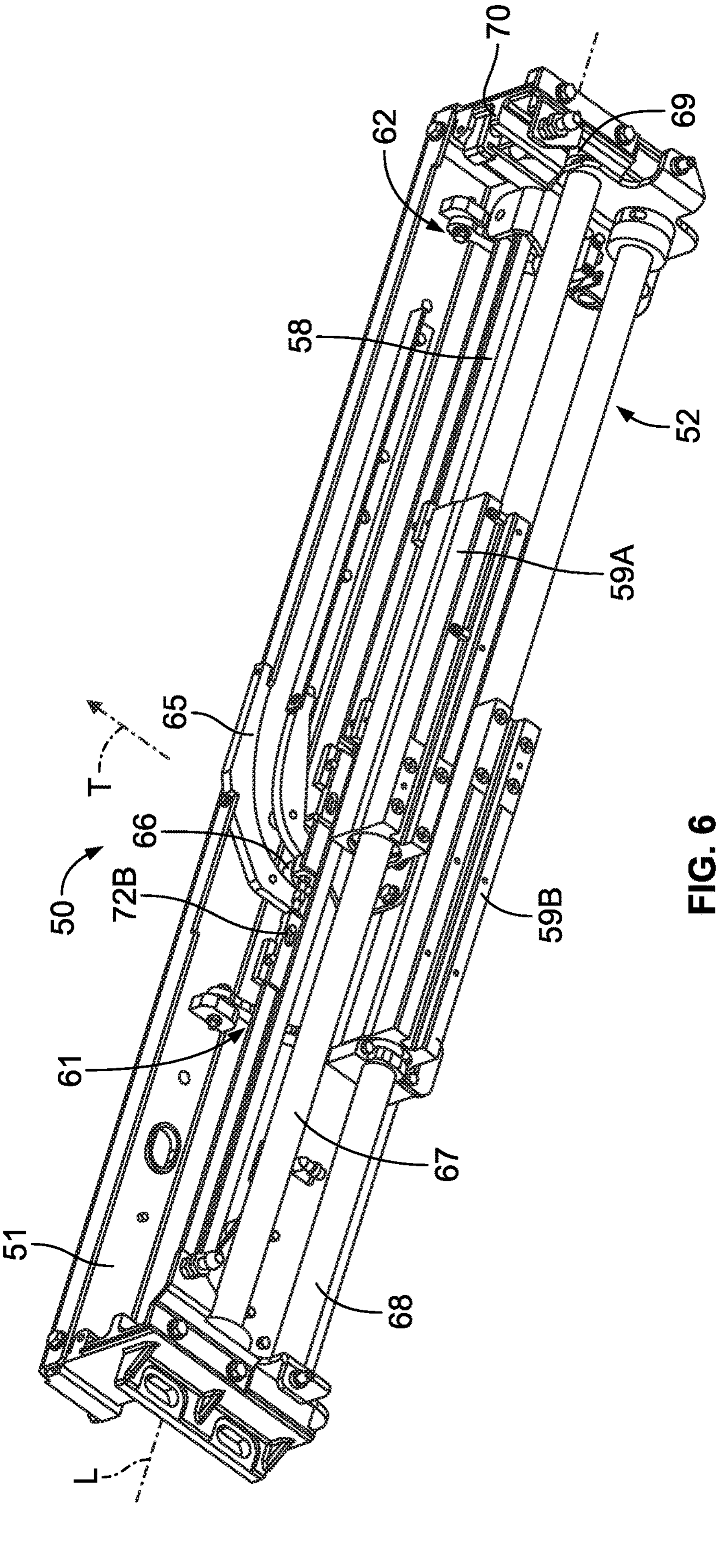
FIG. 6 is a reverse perspective view of the vehicle door operator system of FIG. 5.

As shown in FIGS. 5 and 6, the base may also include a curved track 65 thereon. A corresponding guide roller 66 is connected to one of the door panels. The guide roller travels within the curved track to guide the door panel between the open and closed positions. While in this example a guide roller may be provided, other guiding mechanisms may be used to move along the curved track to provide the movement as desired.

Figure 8:
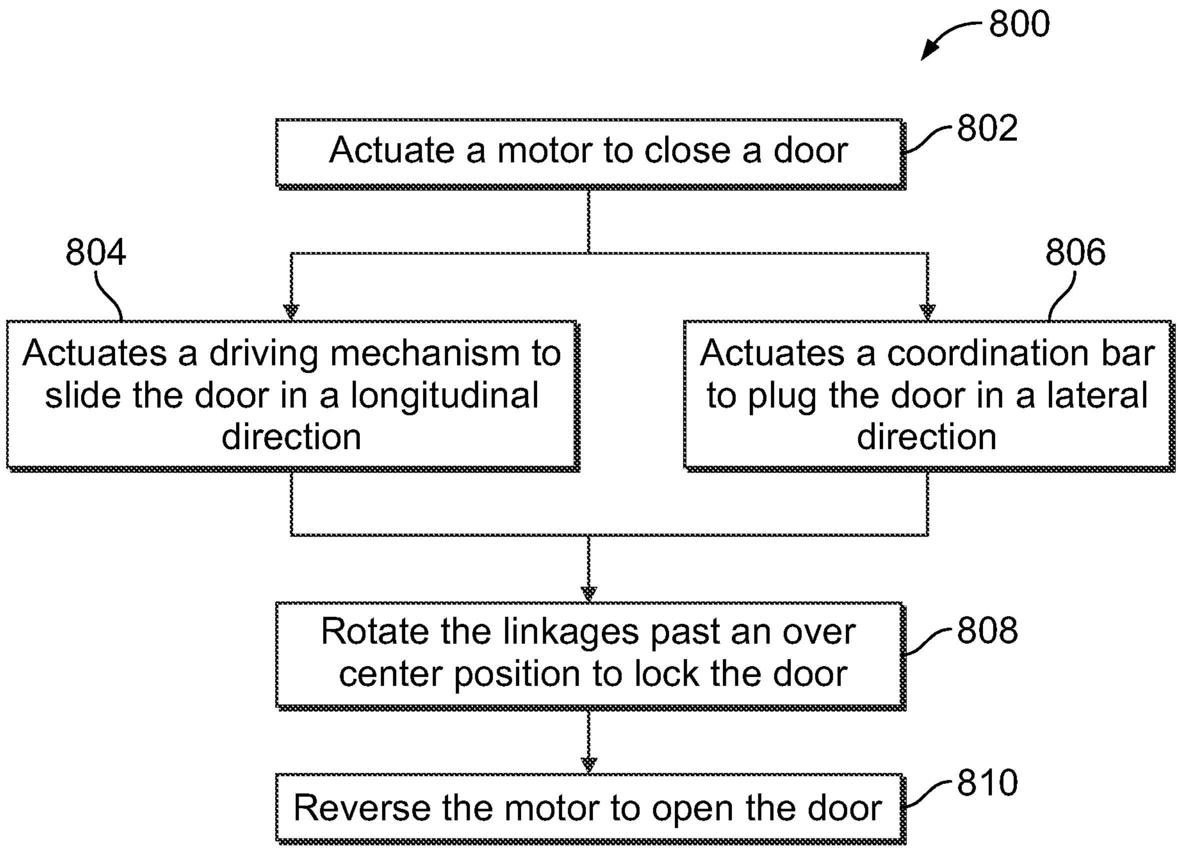
FIG. 8 is a process flow diagram of a method of operating a vehicle door.

FIG. 8 illustrates a process flow diagram of a method 800 of opening and closing a vehicle door. In one example, the door operator system of FIGS. 1-7 is used to perform the method. While described in relation to a single door, the method may be used to open and close a single door, or a pair of doors within an opening of the vehicle.

At step 802, starting with a door in an open position on the vehicle, a motor is actuated to close the door. The actuation results in rotation of the motor output shaft in a first direction and the motor housing in a second direction. In one example the first direction may be clockwise while the second direction is counterclockwise. Alternatively, the first direction may be counterclockwise while the second direction is clockwise.

At step 804, the rotation of the motor output shaft in the first direction actuates a driving mechanism that may slide the door in a longitudinal direction. In one example, the driving mechanism may include a right angle gear box that may be coupled to a pulley system. The pulley system in one example may include a toothed drive pulley, a return pulley, and a drive belt as described herein. In one embodiment, the motor output shaft is coupled to a coordination bar instead of the driving mechanism. As a result, the rotation results in the coordination bar actuating a linkage assembly to provide a plugging motion to the door, moving the door laterally towards the opening. Because the driving mechanism and coordination bar are both actuated by a rotational actuator, and the motor has two rotating elements, the output shaft, and the housing, the motor may be reversible within the system. Specifically, the system functions as a differential mechanism between the driving mechanism and coordination bar.

At step 806, the rotation of the motor housing in the second direction actuates a coordination bar that may plug the door in a lateral direction towards the door opening. The rotation of the motor housing and plugging of the door may occur simultaneously as the door is slid as a result of the motor output shaft. In one example, the coordination bar may couple to a linkage assembly that includes a lever that pushes the door towards the opening. In one embodiment, the motor housing is coupled to a driving mechanism instead of the coordination bar. As a result, the rotation results in the driving mechanism actuating a drive belt to provide a sliding motion to the door, moving the door longitudinally within the door opening.

At step 808, the linkages move past an over center position to lock the door in place. The door at this point is in a closed position. Specifically, in one example, the linkage assembly may include a lever and linkage arm that are both moved over center with respect to each other such that lateral movement does not cause rotation of the linkage arm about its center axis, forming a locking mechanism. In this manner, an individual pushing against the door cannot force the door open, and instead, only the rotational movement of the actuating member (e.g. coordination bar and linkage assembly) causes movement of the door in a lateral direction.

At step 810, the motor is reversed, causing rotation of the driving mechanism and coordination bar in opposite directions. As a result, the driving mechanism actuates to slide the door longitudinally to an opened position, while the coordination bar actuates to move the door laterally away from the opening to the open position. Similar to the previous steps, the coupling of the motor may be reversed such that both the motor output shaft, and motor housing may drive the actuation of the driving mechanism and coordination bar.

Thus, provided is a door operator system that uses the natural counterrotation of the motor to provide an additional function in opening and closing a door within a door opening for a vehicle. The rotation in the first direction may be used to provide a sliding motion of a door or doors, while the counterrotation in the second direction may be used to provide a plugging motion of the door or doors. Consequently, efficient use of the motor is provided, and expenses reduced.

In one or more embodiments, a system that may be provided that includes a base that may be mounted on a vehicle above a door, and a carriage assembly that may be movably connected to the base and may move with respect to the base. The carriage assembly may include a motor including a motor output shaft and a motor housing, and a driving mechanism may couple to the door and to couple to the motor output shaft or the motor housing. The driving mechanism may move in response to operation of the motor. The carriage assembly may also include a coordination bar that may be coupled to the motor output shaft, or the motor housing, the motor output shaft or the motor housing may rotate the coordination bar responsive to operation of the motor. The system may also include at least one linkage assembly that may be coupled between the base and the coordination bar. The at least one linkage assembly may extend or retract to move the carriage assembly with respect to the base to move the door between an open position and a closed position based on rotation of the coordination bar.

Optionally, the carriage assembly may also include a gearbox and drive pulley that may operatively couple the motor to the driving mechanism. In another embodiment, the at least one linkage assembly may include a lever that may be fixedly coupled to the coordination bar and a linkage arm that may be pivotably coupled with the base. Alternatively, the lever and the linkage arm may move over center while the carriage assembly is extended with respect to the base to form an over center lock.

In another aspect, the system may also include a curved track that may be connected to the base and a roller may be coupled to the door. The roller may travel within the curved track to guide the door between the open position and the closed position. Optionally, the door may comprise a pair of door panels, and the carriage assembly may move the pair of door panels between the open position and the closed position. In another example, the carriage assembly may also include a support beam may have the door slidably mounted thereon.

Optionally, the carriage assembly may be movably coupled to the base by at least one roller engaged within tracks defined in opposing ends of the base. In another aspect, the motor may not be fixed to the carriage assembly. Optionally, the driving mechanism may be a drive belt.

In one or more embodiments, a system may include a base that may be mounted on a transit vehicle above a door, and a carriage assembly movably connected to the base and that may move with respect to the base. The carriage assembly may include a motor including a motor output shaft and a motor housing, a driving mechanism that may couple to the door and be coupled to one of the motor output shaft or the motor housing and may move in response to operation of the motor. The carriage assembly may also include a coordination bar that may be coupled to the motor output shaft, or the motor housing, the motor output shaft or the motor housing may rotate the coordination bar responsive to operation of the motor to move the door between an open position and closed position based on rotation of the coordination bar. The system may also include a lever coupled to the coordination bar and may move over center when the carriage assembly is extended with respect to the base to form an over center lock.

Optionally, at least one linkage assembly may be coupled between the base and the coordination bar that includes the lever, and may extend or retract to move the carriage assembly with respect to the base to move the door between a locked open position and the closed position based on the rotation of the coordination bar. Alternatively, the at least one linkage assembly may include a linkage arm that may move over center when the over center lock is formed. In one embodiment, the at least one linkage assembly may not include a helix spring. In another example, the motor housing may rotate in an opposite direction to the motor output shaft to rotate the coordination bar in an opposite direction compared to the driving mechanism. The system may also include a curved track connected to the base and a roller that may be coupled to the door, wherein the roller travels within the track to guide the door between the open position and the closed position. In one embodiment, the door may comprise a pair of door panels, and the carriage assembly may move the pair of door panels between the open position and the closed position.

In one or more embodiments, a system may be provided including a base that may be mounted on a transit vehicle above a door, and a carriage assembly movably connected to the base and may move with respect to the base. The carriage assembly may include a motor including a motor output shaft that may rotate in a first direction and a motor housing that may rotate in a second direction opposite the first direction, a driving mechanism may couple to the door and coupled to one of the motor output shaft or the motor housing and may rotate in the first direction in response to operation of the motor, and a coordination bar may be coupled to the motor output shaft or the motor housing, the motor output shaft or the motor housing may rotate the coordination bar in the second direction responsive to operation of the motor. The system may also include at least one linkage assembly coupled between the base and the coordination bar and may extend or retract to move the carriage assembly with respect to the base to move the door between an open position and a closed position based on rotation of the driving mechanism in the first direction and rotation of the coordination bar in the second direction.

Optionally, the driving mechanism may be a drive belt coupled to a drive pulley to move the door between the open position and the closed position.

In another example, the at least one linkage assembly may move the door outwardly away from a door opening as the door moves laterally between the open position and the closed position.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a base configured to be mounted on a vehicle above a door;

a carriage assembly configured to be movably connected to the base and configured to move with respect to the base, the carriage assembly comprising a motor including a motor output shaft and a motor housing configured to rotate in opposite directions during movement of the door, a driving mechanism configured to couple to the door and to couple to the motor output shaft for movement of the door in a longitudinal direction in response to operation of the motor, and a coordination bar configured to be coupled to the motor housing, the motor housing configured to rotate the coordination bar responsive to operation of the motor to move the door in a lateral direction; and at least one linkage assembly configured to be coupled between the base and the coordination bar, the at least one linkage assembly configured to extend or retract to move the carriage assembly with respect to the base to move the door between an open position and a closed position based on rotation of the coordination bar, the at least one linkage assembly including a lever configured to be fixedly coupled to the coordination bar and a linkage arm configured to be pivotably coupled with the base, the lever and the linkage arm configured to move over center while the carriage assembly is extended with respect to the base to form an over center lock.

2. The system according to claim 1, wherein the carriage assembly further comprises a gearbox and drive pulley configured to operatively couple the motor to the driving mechanism.

3. The system according to claim 1, comprising a curved track configured to be connected to the base and a roller configured to be coupled to the door, wherein the roller is configured to travel within the curved track to guide the door between the open position and the closed position.

4. The system according to claim 1, wherein the door comprises a pair of door panels, and wherein the carriage assembly is configured to move the pair of door panels between the open position and the closed position.

5. The system according to claim 1, wherein the carriage assembly further comprises a support beam configured to have the door slidably mounted thereon.

6. The system according to claim 1, wherein the carriage assembly is movably coupled to the base by at least one roller engaged within tracks defined in opposing ends of the base.

7. The system according to claim 1, wherein the motor is not fixed to the carriage assembly.

8. The system according to claim 1, wherein the driving mechanism comprises a drive belt and the coordinating bar is solid or semi-rigid.

9. A system comprising:

a base configured to be mounted on a transit vehicle above a door;

a carriage assembly movably connected to the base and configured to move with respect to the base, the carriage assembly comprising a motor including a motor output shaft and a motor housing configured to rotate in opposite directions during movement of the door, a driving mechanism configured to couple to the door and coupled to the motor output shaft for movement of the door in a longitudinal direction in response to operation of the motor, and a coordination bar configured to be coupled to the motor housing, the motor housing configured to rotate the coordination bar responsive to operation of the motor to move the door in a lateral direction between an open position and closed position;

a lever coupled to the coordination bard and a linkage arm configured to be pivotably coupled with the base, the lever and the linkage arm configured to move over center when the carriage assembly is extended with respect to the base to form an over center lock.

10. The system according to claim 9, wherein the linkage arm is included in at least one linkage assembly coupled between the base and the coordination bar that includes the lever, and is configured to extend or retract to move the carriage assembly with respect to the base to move the door between a locked open position and the closed position based on the rotation of the coordination bar.

11. The system according to claim 10, wherein the at least one linkage assembly does not include a helix spring.

12. The system according to claim 9 comprising a curved track connected to the base and a roller configured to be coupled to the door, wherein the roller travels within the track to guide the door between the open position and the closed position.

13. The system according to claim 9, wherein the door comprises a pair of door panels, and wherein the carriage assembly is configured to move the pair of door panels between the open position and the closed position.

14. A system comprising:

a base configured to be mounted on a transit vehicle above a door;

a carriage assembly movably connected to the base and configured to move with respect to the base, the carriage assembly comprising a motor including a motor output shaft configured to rotate in a first direction and a motor housing configured to rotate in a second direction opposite the first direction, a driving mechanism configured to couple to the door and coupled to the motor output shaft for movement of the driving mechanism in the first direction and the door in a longitudinal direction in response to operation of the motor, and a coordination bar configured to be coupled to the motor housing for rotation of the coordination bar in the second direction to move the door in a lateral direction responsive to operation of the motor; and at least one linkage assembly coupled between the base and the coordination bar and configured to extend or retract to move the carriage assembly with respect to the base to move the door between an open position and a closed position based on rotation of the driving mechanism in the first direction and rotation of the coordination bar in the second direction, the at least one linkage assembly including a lever configured to be fixedly coupled to the coordination bar and a linkage arm configured to be pivotably coupled with the base, the lever and the linkage arm configured to move over center while the carriage assembly is extended with respect to the base to form an over center lock.

15. The system according to claim 14, wherein the driving mechanism is a drive belt coupled to a drive pulley to move the door between the open position and the closed position.

16. The system according to claim 14, wherein the at least one linkage assembly is configured to move the door outwardly away from a door opening as the door moves laterally between the open position and the closed position.

* * * * *